United States Patent

Akimoto et al.

[11] Patent Number: 5,818,620
[45] Date of Patent: Oct. 6, 1998

[54] BURST OPTICAL SIGNAL RECEIVER

[75] Inventors: Yo Akimoto; Norio Nagase; Yoshihiro Saito; Kakuji Inoue, all of Yokohama; Hiroyuki Nobuhara; Kazuyuki Mori, both of Kawasaki, all of Japan

[73] Assignee: Fujitsu Limited, Kawasaki, Japan

[21] Appl. No.: 757,625

[22] Filed: Nov. 27, 1996

[30] Foreign Application Priority Data

Jan. 30, 1996 [JP] Japan .................................. 8-013897

[51] Int. Cl.⁶ .................................................. H04B 10/06
[52] U.S. Cl. ........................ 359/189; 359/194; 250/214 A
[58] Field of Search ................................. 359/189, 194, 359/137; 250/214 A; 375/317, 318

[56] References Cited

U.S. PATENT DOCUMENTS 5,307,196  4/1994  Kinoshita ................... 359/189
5,612,810  3/1997  Inami et al. ................ 359/189

Primary Examiner—Kinfe-Michael Negash
Attorney, Agent, or Firm—Staas & Halsey

[57] ABSTRACT

A burst optical signal receiver receives optical signals produced in a burst form from a predetermined subscribers. This burst optical signal receiver comprises an identifying circuit for comparing the input level of an input optical signal with a predetermined threshold value to identify the input level; a peak detector for detecting and holding the peak value of the input optical signal; a DC feedback circuit for acquiring the DC level of an output of the identifying circuit; and a circuit for producing the predetermined threshold value from the DC level from the DC feedback circuit and the peak value held in the peak detector and supplying the predetermined threshold value to the identifying circuit. The peak detector has a plurality of peak detection sections having different gains and operational dynamic ranges and causes those peak detection sections to operate in accordance with the input level of the input optical signal.

13 Claims, 22 Drawing Sheets a —— input signal
b ······ peak value detected (same as FIG. 3A)

DATA-IN

RESET

DATA-OUT

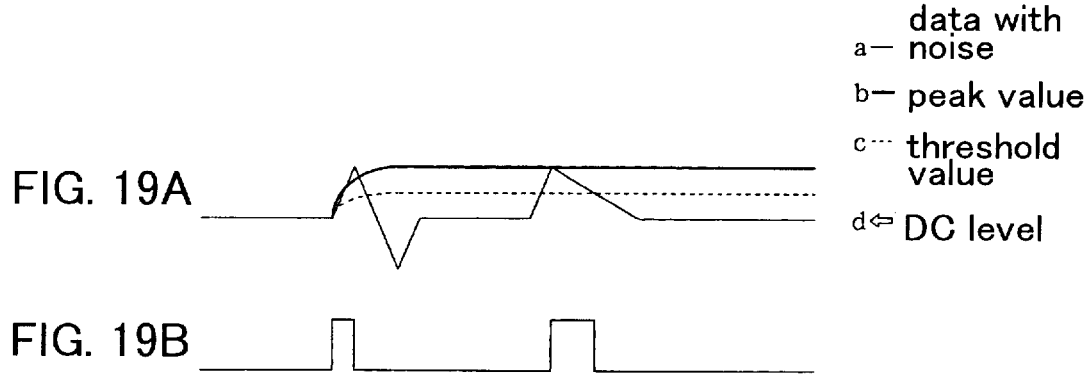

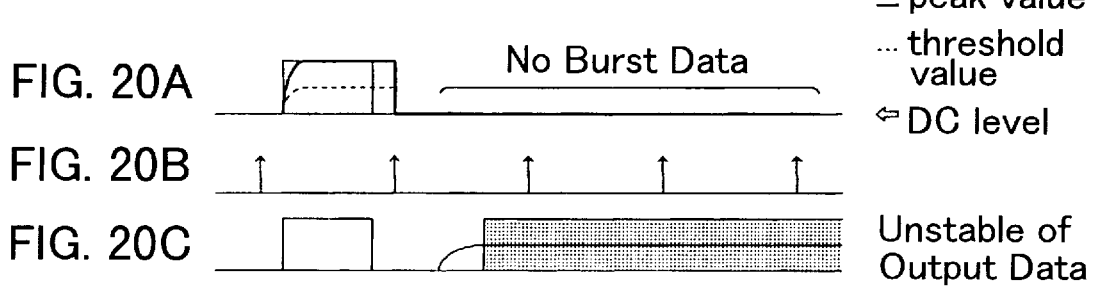

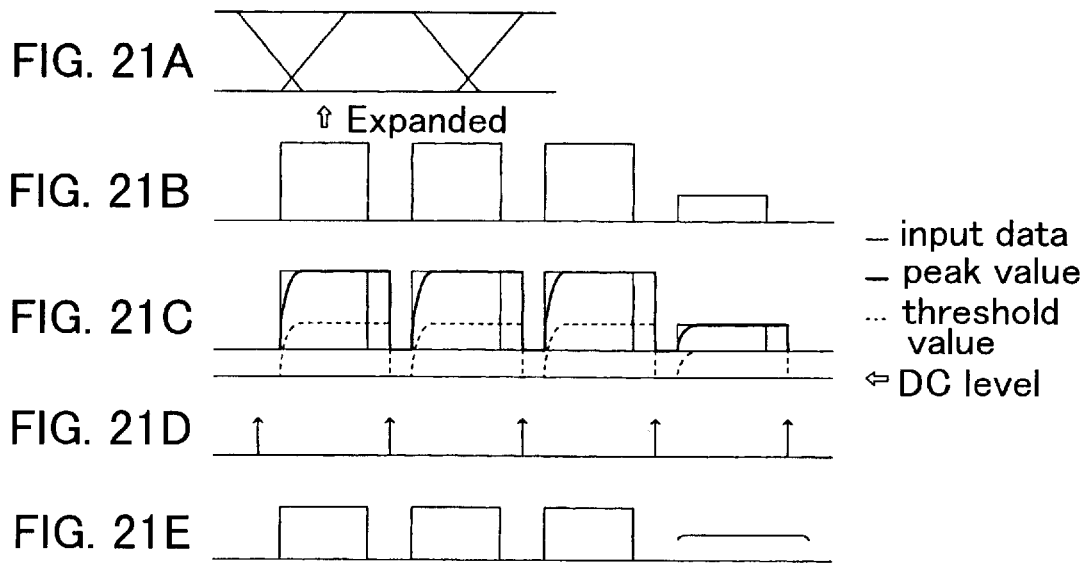

BURST OPTICAL SIGNAL RECEIVER

BACKGROUND OF THE INVENTION

1. Field of the Invention

The present invention relates to a receiver for burst optical signals, and, more particularly, to a burst optical signal receiver which receives optical signals produced in a burst pattern from a plurality of subscribers.

2. Description of the Related Art

FIG. 14 presents a diagram for explaining the position of an optical receiver to which the present invention is directed. The exemplified system comprises a single station 100 and a plurality of optical network subscriber units (hereinafter simply called "subscribers") ONU#1 to ONU#N connected thereto via a star coupler 3, and performs bidirectional signal transfer. Although there is one star coupler 3 in the illustration, a plurality of star couplers to each of which a plurality of subscribers are connected may be connected to the station 100.

The station 100 includes an optical receiver 1 for burst optical signals to which this invention is directed, a circuit 2 for performing digital processing on digital signals acquired by converting optical signals received by this optical receiver 1 to electrical signals. The circuit 2 may be a circuit which distributes multiplexed digital signals to the individual subscribers.

With reference to time charts in FIGS. 15A through 15D, a description will now be given of an example of the time chart for upward burst transfer to the optical receiver 1 from a plurality of subscribers ONU#1 to ONU#N.

FIGS. 15A and 15B show burst optical signals from the subscribers ONU#1 and ONU#N, respectively. The burst optical signal from the subscriber ONU#1 is generated at a burst data cell positions a and c, and the burst optical signal from the subscriber ONU#N is generated at a burst data cell position b.

Accordingly, the optical receiver 1 which is designed to cope with burst optical signals receive the burst optical signals from the subscribers ONU#1 and ONU#N, sent through the star coupler 3, in the order of generation, as shown in FIG. 15C. The reception level of the burst optical signal from the subscriber ONU#1 is lower than that of the burst optical signal from the subscriber ONU#N.

The difference between the reception levels of burst optical signals from different subscribers occurs due to the following reasons. First, the transfer path loss based on the lengths of optical transfer paths varies from one subscriber to another. Secondly, the branching ratio of the star coupler varies in accordance with the connection mode.

The optical receiver 1 should convert an optical signal with different reception levels as shown in FIG. 15C to a logic signal with two values as shown in FIG. 15D in order to give the optical signal to the digital processing section 2.

FIG. 16 exemplifies the structure of the conventional optical receiver 1 which handles a burst optical signal. In FIG. 16, an optical signal received by a photodiode 10 as a light-receiving element is converted to an electric signal, which is in turn amplified by a preamplifier 11. The amplified signal is then supplied to an identifying circuit 12 which has an automatic threshold control function. The identifying circuit 12 outputs "1" when the signal level of the received signal exceeds the threshold value and outputs "0" when the signal level is equal to or lower than the threshold value.

The output of the identifying circuit 12 is sent out through a buffer amplifier 13 as identification data.

Referring to FIG. 16, a peak holding capacitor CP holds the peak value of a burst optical signal and the threshold value which is the identification level of the burst optical signal is automatically controlled in the identifying circuit 12 in association with the held peak value. The peak value held in the peak holding capacitor CP is reset for discharge by a reset circuit 14 at the end of the burst signal.

The identifying circuit 12 is structured as exemplified in FIG. 17. Specifically, this identifying circuit 12 has a peak detector 120, which includes the peak holding capacitor CP as one constituting element, a limiter amplifier 123, an operational amplifier 125, a DC feedback circuit 124 including an integrator, which has an integrating resistor 126 and an integrating capacitor 127, and a level halving circuit 128. It is premised on that input data to the identifying circuit 12 has a mark ratio of ½ in a burst cell.

The operation of the identifying circuit 12 which has the automatic threshold control function will be described below with reference to the operation time charts in FIGS. 18A and 18B. The peak detector 120, which includes an amplifier 121 and a rectifying diode 122, charges the peak holding capacitor CP until the peak value of the input data coincides with the charge voltage.

The DC feedback circuit 124 controls the DC level to a constant level. The DC feedback circuit 124 receives the positive logic value and negative logic value of data output from the limiter amplifier 123 and outputs the difference between those logic values from the operational amplifier 125. The output of the operational amplifier 125 is averaged by the integrator which is constituted by the resistor RDC 126 and the capacitor CDC 127. The output of the integrator therefore has a DC level (see "d" in FIG. 18A).

Since it is premised on that input data to the identifying circuit 12 has a mark ratio of ½ in a burst cell, as described earlier, the level halving circuit 128 outputs a value (see "c" in FIG. 18A) which is a half the difference between the peak value of the input data (see "b" in FIG. 18A), detected by the peak holding capacitor CP, and the output of the DC feedback circuit 124.

The output of the level halving circuit 128 is input as a threshold value to one input terminal of the limiter amplifier 123. The limiter amplifier 123 receives burst data (see "a" in FIG. 18A) at the other input terminal and identifies the level of this burst data based on the threshold value input to said one input terminal.

Specifically, the limiter amplifier 123 outputs "1" to a positive logic output terminal O and "0" to a positive logic output terminal/O when the level of the burst data exceeds the threshold value. When the level of the burst data is equal to or smaller than the threshold value, the outputs have the opposite relation to that of the previous case.

A reset signal RS shown in FIG. 18B is given to discharge the charges held in the peak holding capacitor CP in FIG. 17 before the timing for the next burst cell.

The conventional burst optical signal receiver with the above-described structure has the following shortcomings.

With regard to the peak detector 120, the following problems arise.

First, it is difficult to accomplish the circuit structure which meets both the requirement that peak detection be performed at a high speed and high precision over a wide input dynamic range of several mV to several hundred mV (wide band and high gain) and the requirement that no oscillation should occur (securing a phase margin).

Secondly, with no input burst data, peak detection is performed on noise. With respect to the peak of noise, therefore, the threshold value is set low at the input section of the limiter amplifier 123, so that the output appears as having amplified noise.

Specifically, when data containing noise changes as indicated by "a" in FIG. 19A, the peak detector 120 holds the peak value of the noise (see "b" in FIG. 19A), so that the limiter amplifier 123 identifies and amplifies the noise level greater than the threshold value (see "c" in FIG. 19A), and outputs the amplified data, as shown in FIG. 19B.

When there is no input data to the DC feedback circuit 124, the peak level=DC (bottom) level becomes the threshold level and the output becomes unsettled or contains unstable noise.

FIG. 20A shows the peak level=DC (bottom) level when there is no input data. FIG. 20B shows the timings for the reset signal, and FIG. 20C shows that the output becomes unsettled.

FIG. 21 is a diagram for explaining a problem caused by a deviation of the DC level. FIG. 21B shows input data, and FIG. 21A is a partly enlarged view of input data shown in FIG. 21B. When the duty ratio of input data is degraded as shown in FIG. 21A, the DC (bottom) level deviates from the bottom level of data (see FIG. 21C) as apparent from the foregoing description of the DC feedback circuit 124 given referring to FIG. 17. In the example in FIG. 21C, the DC (bottom) level has fallen too low and does not coincide with the bottom level of data.

As a result, when a small-signal data cell is input immediately following a large-signal data cell (see FIG. 21C), the level of the small signal cannot be identified as shown in FIG. 21E.

Like the first problem, it is difficult to realize the circuit structure which resets stored charges corresponding to the peak detection level of the peak holding capacitor CP. When resetting is enabled with input data present, charging the peak holding capacitor CP and discharging this capacitor CP occur simultaneously, so that peak detection becomes unstable.

FIGS. 22A through 22C are diagrams for explaining this problem. Assuming that there is input data as shown in FIG. 22A and the reset signal RS is produced during the period in which the input data is present as shown in FIG. 22B, the peak detection system including the amplifier 121 and the discharge system including the reset circuit 14 become a short-circuited path through which an excess current flows as shown in FIG. 22C. Consequently, the value of the peak detection level of the peak holding capacitor CP becomes unstable.

SUMMARY OF THE INVENTION

Accordingly, it is a primary object of the present invention to provide a burst optical signal receiver capable of executing a peak detecting operation at a high speed and high precision without oscillation.

It is another object of this invention to provide a burst optical signal receiver which overcomes the conventional problem such that the threshold value is set low with respect to the peak level of noise and the output appears as having amplified noise.

It is a further object of this invention to provide a burst optical signal receiver which overcomes the problem such that when there is no input data to the DC feedback circuit, the peak level=DC (bottom) level becomes the threshold level and the output becomes unsettled or contains unstable noise.

It is a still further object of this invention to provide a burst optical signal receiver which overcomes the problem such that when the duty ratio of input data is degraded, the DC (bottom) level deviates from the bottom level of data, disabling the identification of a small-signal data cell input immediately following a large-signal data cell.

It is a yet still further object of this invention to provide a burst optical signal receiver which is designed to cope with the conventional difficulty to realize the circuit structure that resets stored charges corresponding to the peak detection level of the peak holding capacitor and to cope with the simultaneous occurrence of charging of the peak holding capacitor and discharging of this capacitor when resetting is enabled with input data present, making peak detection unstable.

BRIEF DESCRIPTION OF THE DRAWINGS

FIGS. 19A and 19B are diagrams for explaining noise on burst data and the operational problem of the ATC;

FIGS. 20A through 20C are diagrams for explaining the problem in the DC feedback circuit which arises when there is no input data;

FIGS. 21A through 21E are diagrams for explaining the problem which originates from a deviation of the DC (bottom) level.

DETAILED DESCRIPTION OF THE PREFERRED EMBODIMENT

Figure 1:
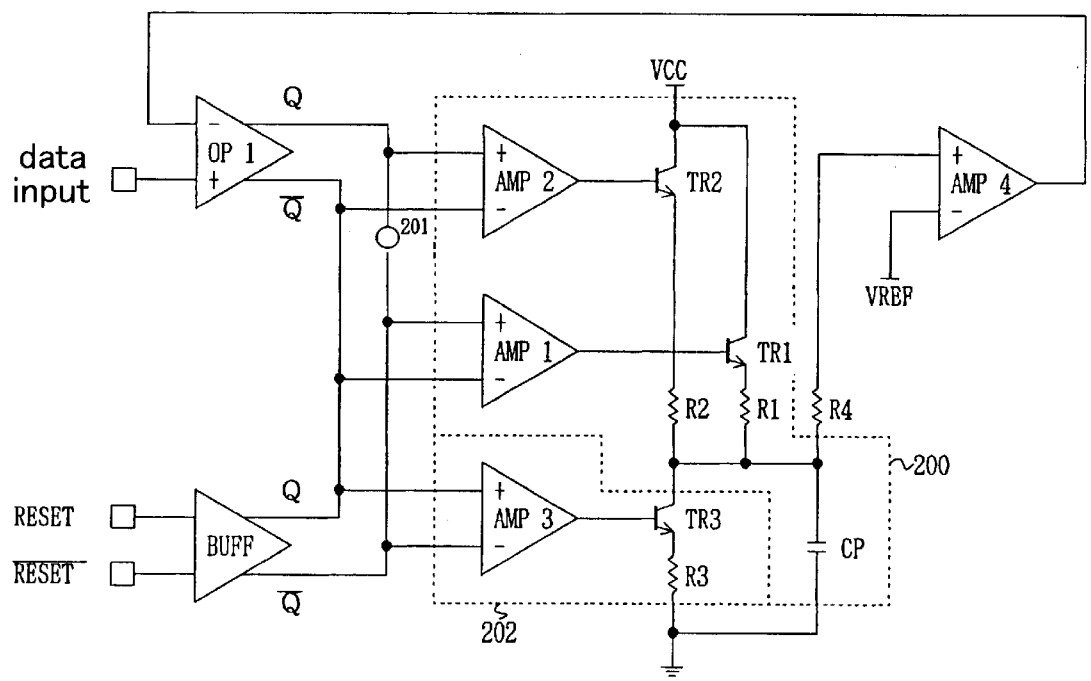
FIG. 1 is a diagram showing one form of a peak detector according to this invention.

A preferred embodiment of the present invention will now be described with reference to the accompanying drawings. To avoid the redundant description, like or same reference numerals are used throughout this description for identical or corresponding components.

FIG. 1 is a diagram showing one form of a peak detector according to this invention, which overcomes the shortcoming of the peak detector 120 in the above-described conventional burst optical signal receiver. FIG. 1 illustrates a reset circuit 202 in addition to the peak detector 120.

Referring to FIG. 1, the peak detector 120 has a peak detection section 200, an operational amplifier OP1 and a comparison amplifier AMP4. The peak detection section 200 includes a large-signal amplifier AMP1, a small-signal amplifier AMP2, transistors TR1 and TR2, resistors R1 and R2, and a peak holding capacitor CP.

The amplifier AMP4 compares the voltage of the peak holding capacitor CP with a reference value VREF and feeds an output corresponding to the difference between the compared voltage and reference value back to the operational amplifier OP1. When data input is "1," the operational amplifier OP1 receiving the data outputs a positive logic Q until the input data coincides with the value fed back from the amplifier AMP4.

While the positive logic Q is being output, the peak holding capacitor CP is charged and a peak value corresponding to the input data is retained as will be discussed later.

In FIG. 1, the peak detector 120 further has the reset circuit 202, which has an amplifier AMP3 and a transistor TR3, and a buffer amplifier BUFF to which a reset signal is input. When the reset signal is input to the buffer amplifier BUFF, the transistor TR3 is turned on by the output of the amplifier AMP3 to cause the peak holding capacitor CP to discharge the retained charges. As a result, the retained peak value is reset.

Figure 2:
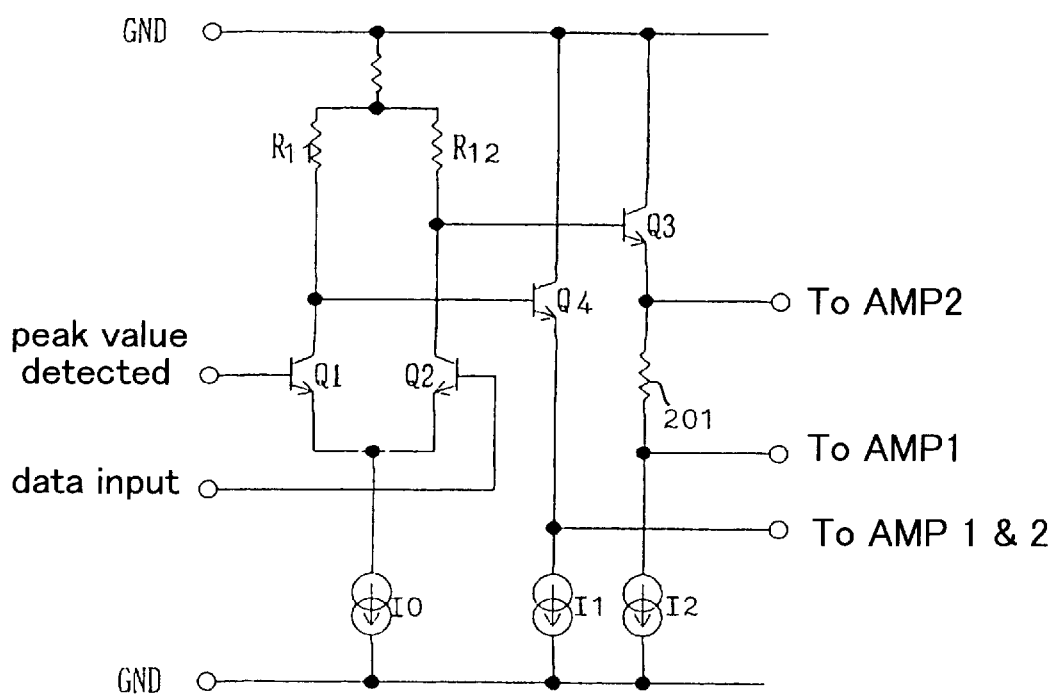
FIG. 2 is a detailed circuit diagram of an amplifier OP1 and an offset circuit in FIG. 1.

FIG. 2 is a detailed circuit diagram for explaining the relationship between the operational amplifier OP1 and an offset circuit 201 in FIG. 1. In FIG. 2, the operational amplifier OP1 comprises a differential pair of transistors Q1 and Q2, collector resistors R11 and R12 of those transistors Q1 and Q2, and a constant current source $I_0$ connected between the common emitter and the ground potential. The operational amplifier OP1 further has transistors Q3 and Q4 on its output sides as positive logic and negative logic output circuit sections.

Referring to FIG. 2, the offset circuit 201 in FIG. 1 is comprised of an offset resistor 201. The output of the transistor Q3 as the positive logic output circuit section is input directly to the positive input terminal of the small-signal amplifier AMP2 and is input via the offset resistor 201 to the positive input terminal of the large-signal amplifier AMP1.

The output of the transistor Q4 as the negative logic output circuit section is input to both the negative input terminals of the large-signal amplifier AMP1 and the small-signal amplifier AMP2.

The thus constituted peak detector 120 according to this invention has two systems, one for a large signal and the other for a small signal. Further, the large-signal system is provided with the offset circuit 201 on the input side of the large-signal amplifier AMP1 in the peak detection section 200. Accordingly, the large-signal system does not respond to a small signal, thus ensuring a fast response characteristic and high precision detection.

FIGS. 3A through 3C and FIGS. 4A through 4C are diagrams for explaining the response characteristics of the peak detector 120 in FIG. 1 respectively when a small signal is input and when a large signal is input. In FIGS. 3A–3C and 4A–4C, "a" (solid line) indicates the input signal, and "b" (broken line) indicates a peak value detected.

Figure 3A:
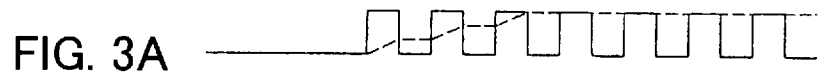
FIGS. 3A through 3C are diagrams showing the response characteristic of the peak detector when a small signal is input.
Figure 3B:
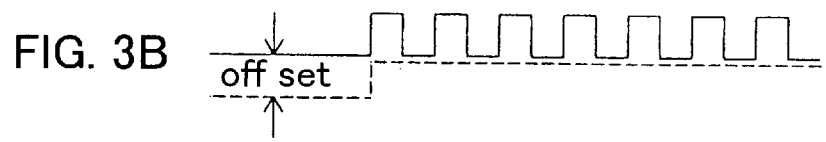

First, the case where a small signal is input will be discussed with reference to FIGS. 3A–3C. When a small signal is input, the small-signal amplifier AMP2 is enabled and its output is charged in the peak holding capacitor CP via the transistor TR2 and the resistor R2 (see FIG. 3A).

Meanwhile, a signal is input to the large-signal amplifier AMP1 via the offset resistor 201 which is the offset circuit. As shown in FIG. 3B, therefore, the level of the positive (+) input terminal of the large-signal amplifier AMP1 is lower than the level of the negative (−) input terminal, so that the large-signal amplifier AMP1 is not enabled and no output appears on its output terminal.

Figure 3C:
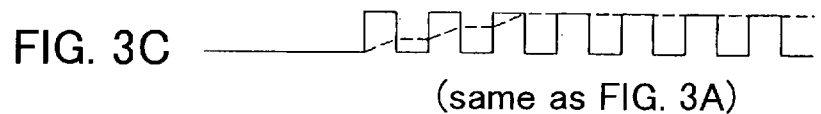

When a small signal is input, as apparent from FIG. 3C, the small-signal amplifier AMP2 alone is enabled to execute only peak detection.

Figure 4A:
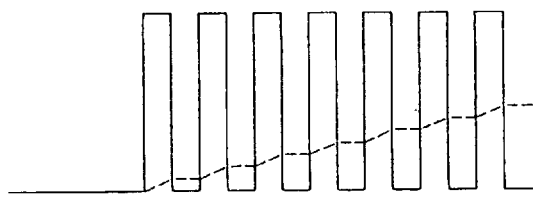
FIGS. 4A through 4C are diagrams showing the response characteristic of the peak detector when a large signal is input.
Figure 4B:
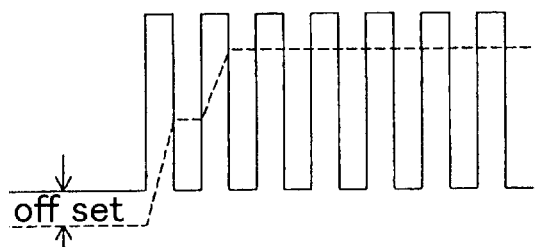
Figure 4C:
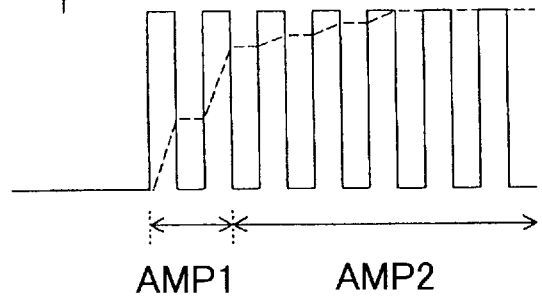

A description will now be given of the case where a large signal is input, referring to FIGS. 4A–4C. The output of the small-signal amplifier AMP2 has a low response speed as shown in FIG. 4A as in the conventional peak detector.

To cope with this problem, this invention uses the large-signal amplifier AMP1. This large-signal amplifier AMP1 quickly responds even to the voltage which is lower than the peak value by the offset voltage produced by the offset resistor 201 (see FIG. 4B).

The emitter outputs of the transistors TRI and TR2, which are connected to the outputs of the large-signal amplifier AMP1 and the small-signal amplifier AMP2, are connected together to the peak holding capacitor CP. Accordingly, the peak holding capacitor CP is charged with the sum of the outputs of the large-signal amplifier AMP1 and the small-signal amplifier AMP2 (see FIG. 4C). It is therefore possible to detect and hold a peak value at a high speed and high precision with respect to an input over a wide input dynamic range. Although the peak detector 120 of the embodiment shown in FIG. 1 has two circuit systems respectively for a small signal and a large signal, this invention is not limited to this particular structure but more than two circuit systems may be provided in accordance with the input level.

Figure 5:
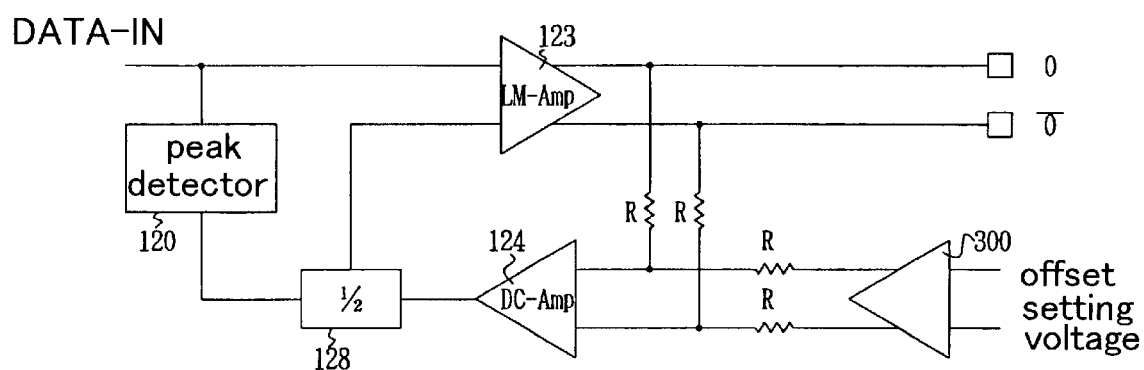
FIG. 5 is a diagram illustrating an embodiment which overcomes the conventional problem that arises when there is no input data (part 1)
Figure 17:
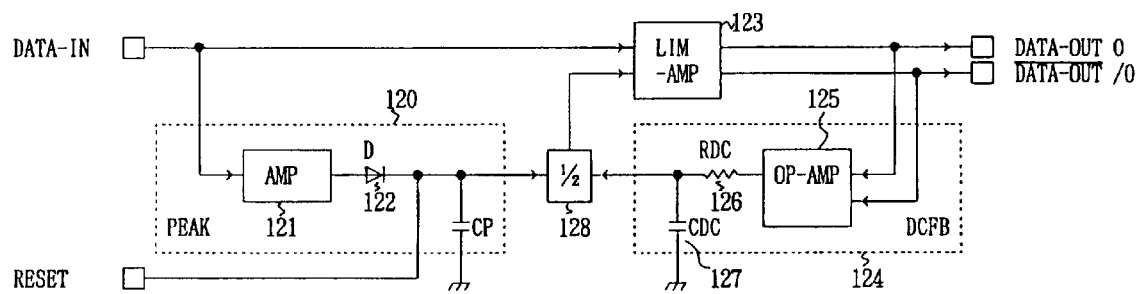
FIG. 17 is a diagram showing one example of an automatic threshold controller (ATC) in FIG. 16.
Figure 18A:
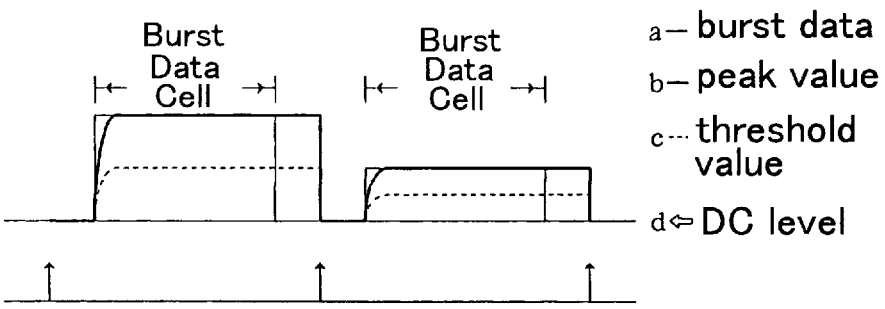
FIGS. 18A and 18B are operational time charts of the ATC in FIG. 17.
Figure 18B:
Figure 22A:
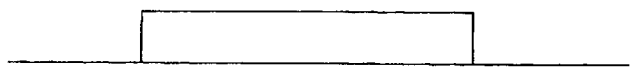
FIGS. 22A through 22C are diagrams for explaining the problem which arises when input data and a reset signal are both supplied.
Figure 22B:
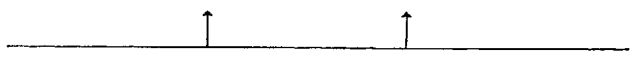
Figure 22C:
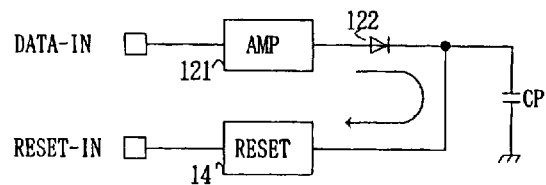

FIG. 5 is a diagram for explaining one form (part 1) of this invention which overcomes the problem of the DC feedback circuit (DCFB) 124 in the conventional apparatus shown in FIG. 17 such that the output becomes unstable due to the relationship of the peak level=DC (bottom) level=threshold level when there is no input data.

FIG. 5 shows only what corresponds to the associated part of the conventional structure in a simplified form. Thus, same reference numerals indicate the corresponding components in FIG. 17. The feature of the circuit in FIG. 5 lies in the addition of a forced offset adder circuit 300.

Specifically, the forced offset adder circuit 300 is a buffer amplifier which receives an offset setting voltage Voff at the input terminal. Therefore, the offset setting voltage Voff is added to the output of the limiter amplifier 123 and the resultant voltage is input to the DC feedback circuit 124. The DC feedback circuit 124 operates so that the voltage between its input terminals becomes 0 V (DC bottom level). Specifically, the added offset voltage is canceled by the output voltage so that the difference between the inputs at both input terminals of the operational amplifier 125 (see FIG. 17) of the DC feedback circuit 124 converges to be zero.

The advantages of adding such an offset setting voltage Voff will further be considered referring to FIG. 6. In FIG. 6, "a" shows the response of input data, which has a period I where there is a signal and a period II where there is no signal. In the same diagram, "b" is the peak value of input data and "c" is the threshold value output from the level halving circuit 128.

Figure 6A:
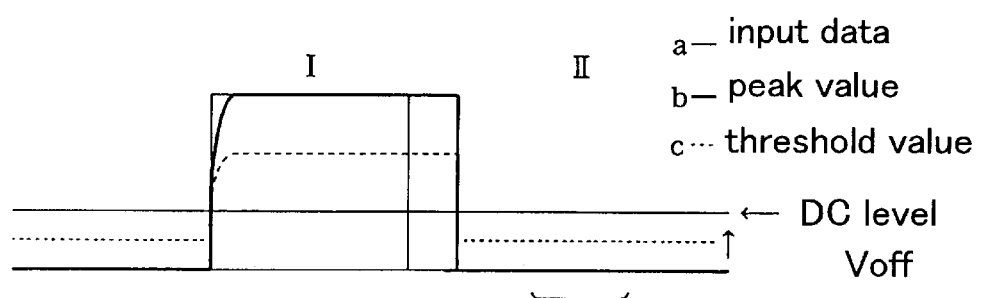
FIGS. 6A and 6B are diagrams for explaining the operation of the embodiment in FIG. 5.
Figure 6B:
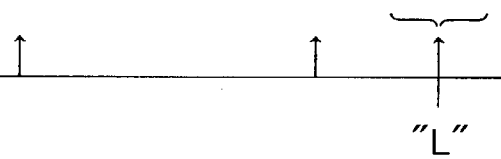

It is apparent from FIGS. 6A and 6B, adding the offset setting voltage Voff raises the DC level by Voff. As the threshold value is set a half of the DC level and the peak value b of the input data, it is set higher than the threshold level before the addition of the offset setting voltage Voff.

Figure 7:
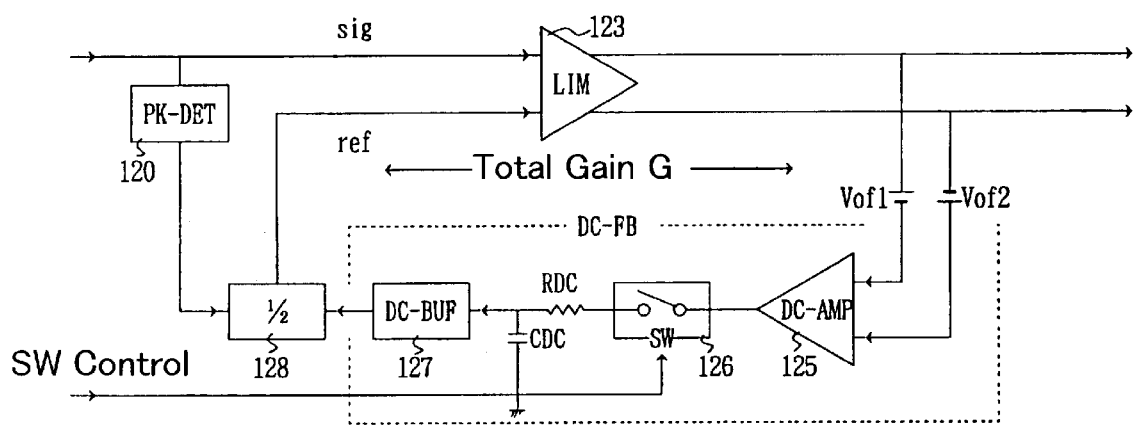
FIG. 7 is a diagram illustrating an embodiment which overcomes the conventional problem that arises when there is no input data (part 2)

When there is no input data, therefore, the limiter amplifier 123 can stably output an "L" level as indicated by the label "L" in FIG. 7. In addition, it is possible to overcome the conventional problem that when noise appears on the output in the period II where no input data is supplied, the input data is erroneously identified due to the noise level.

FIG. 7 is a diagram for explaining another form (part 2) of this invention which, like the one shown in FIG. 5, overcomes the conventional problem when there is no input data. Like FIG. 5, FIG. 7 shows only what corresponds to the associated part of the conventional structure in a simplified form. Thus, same reference numerals indicate the corresponding components in FIG. 17. FIG. 7 shows a buffer amplifier 127 which serves to improve the characteristic of the integrating circuit (the resistor RDC and capacitor CDC) of holding the DC level.

Figure 8:
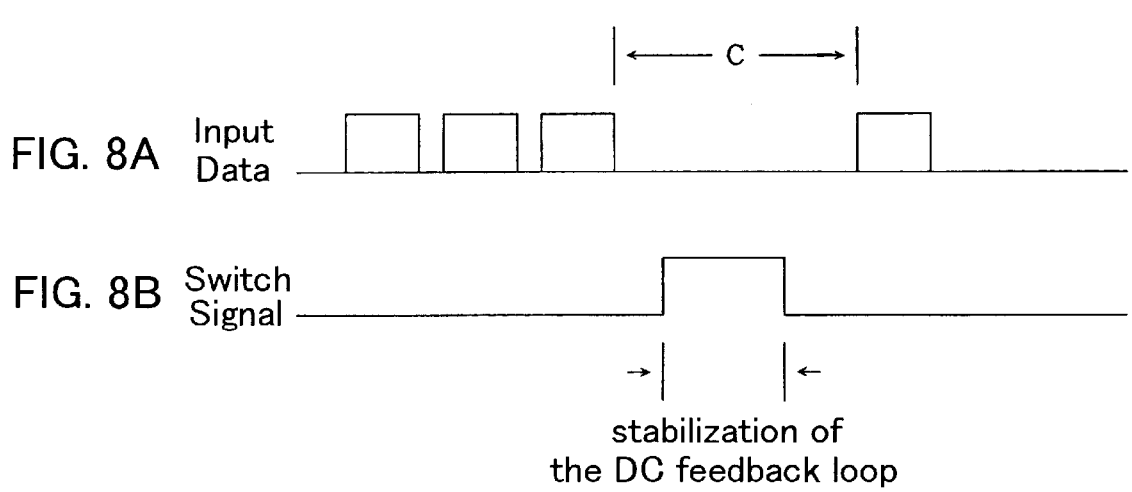
FIGS. 8A and 8B are diagrams for explaining the relationship between input data and a switch signal.

FIGS. 8A and 8B present time charts for explaining the operation of the circuit in FIG. 7. As shown in FIG. 8, a dataless period C is previously set on the system side, and the stabilization of the DC feedback loop is attempted during this period. This structure is accomplished by inserting an analog switch circuit 126 in series to the DC feedback circuit 124, as shown in FIG. 7.

In the preset dataless period C, the switch 126 is closed to close the DC feedback loop upon reception of a switch control signal externally supplied. While this DC feedback loop is being closed, the DC (bottom) level is held in the capacitor CDC. Accordingly, an identification signal for identifying the "L" level without being affected by noise can be supplied to the limiter amplifier 123.

Figure 9:
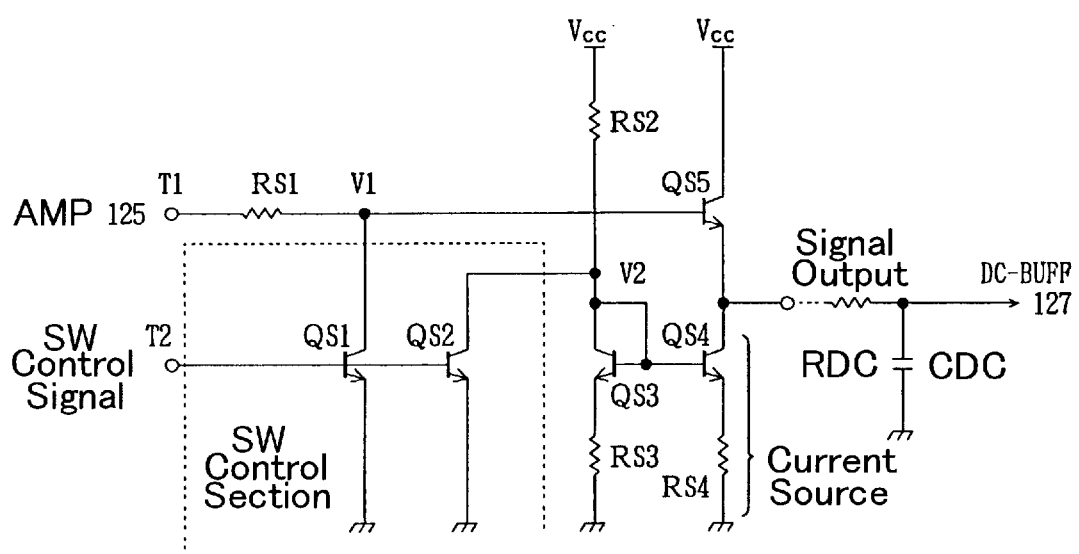
FIG. 9 is a diagram for specifically explaining an analog switch circuit in FIG. 7.

FIG. 9 shows a specific example of the analog switch circuit 126 in FIG. 7. In the circuit in FIG. 9, the output of the amplifier 125 is input to a terminal T1 and a switch control signal SW is input to a terminal T2.

This analog switch circuit 126 comprises a switch control section having transistors QS1 and QS2, a constant current source, which is constituted by a current-mirror circuit having transistors QS3 and QS4, and a transistor QS5 which has an emitter connected to this constant current source and serves as an emitter follower.

In this circuit, when the switch control signal SW has a sufficient low voltage level, the transistors QS1 and QS2 of the switch control section are turned off. The transistor QS5 as an emitter follower, which is biased by the current source formed by the current-mirror circuit, causes a voltage drop of the signal input from the amplifier 125 at the terminal T1 by $V_{BE}$ of the transistor QS5, and outputs the voltage-dropped signal as its output signal to the integrating circuit (constituted by the resistor RDC and capacitor CDC).

When the control input becomes a high voltage, the transistors QS1 and QS2 become enabled, dropping the voltages at V1 and V2. When the voltage at V1 falls sufficiently, the transistor QS5 has the base and emitter reverse-biased (the emitter voltage is held by the capacitor CDC) and is thus turned off.

When the voltage at V2 falls sufficiently to be smaller than $V_{BE}$ of the transistors QS3 and QS4, the transistors QS3 and QS4 are turned off, shutting off the current from the current source. Consequently, the signal output terminal becomes a high-impedance state.

Figure 10:
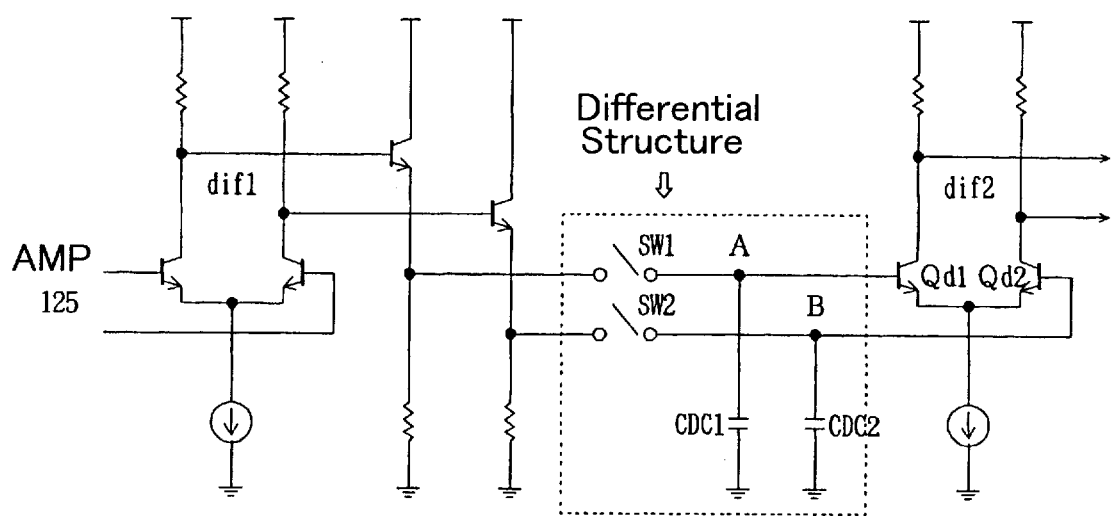
FIG. 10 is a diagram for explaining a structural example which realizes the switch circuit in FIG. 7 in the form of a differential structure.

FIG. 10 shows another form of the switch circuit 126 in FIG. 7 which has a differential structure. This switch circuit 126 has a first differential amplifier pair dif1 and switches SW1 and SW2 provided in association with those amplifiers. Therefore, the capacitor CDC in FIG. 7 is separated to two capacitors CDC1 and CDC2.

The closing/opening actions of the switches SW1 and SW2 are controlled by the switch control signal SW as mentioned earlier. A second differential amplifier pair dif2 serve as the buffer amplifier 127 in FIG. 7. In the illustrated structure, when the peak value of the output of the amplifier 125 is held (i.e., the switches SW1 and SW2 are closed), a voltage drop at point A is determined by the capacitance of the capacitor CDC1 and the base current of the second differential amplifier pair dif2. As the switch section is designed to take a differential form, only the difference between the potentials at points A and B is transmitted to the next stage through the second differential amplifier pair dif2. If the base currents of the transistors Qd1 and Qd2 of the second differential amplifier pair dif2 is in good balance, therefore, the common mode can be canceled to improve the peak value holding characteristic.

Figure 11:
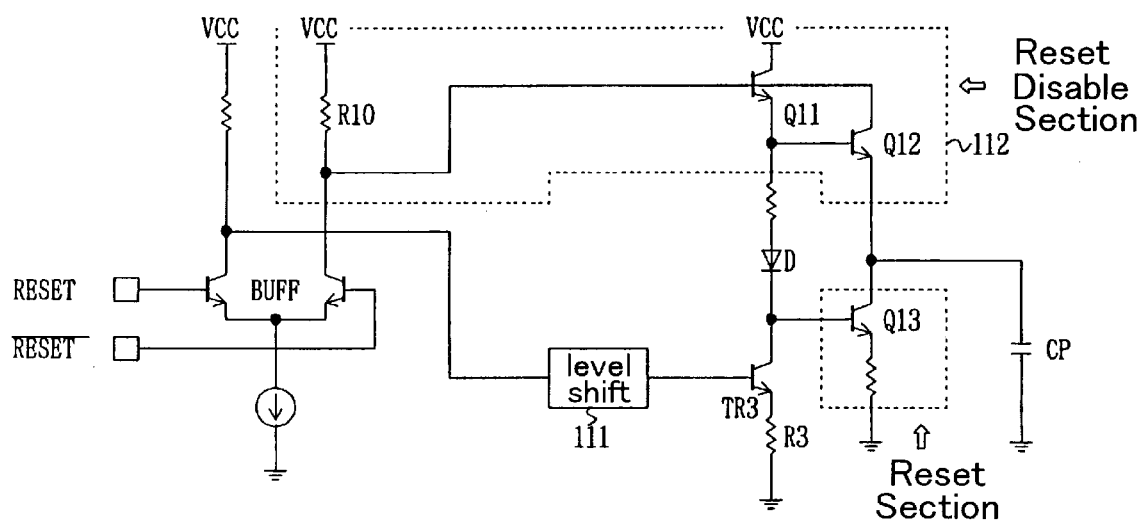
FIG. 11 is a diagram illustrating the structure of a reset disable circuit.

FIG. 11 shows the structure which corresponds to the buffer amplifier BUFF and the reset circuit 202 in FIG. 1 and overcomes the problem of the conventional reset circuit 14. That is, this structure is designed to cope with the difficulty to realize the circuit which stably resets the peak detection level.

In FIG. 11, the circuit in FIG. 1 is additionally provided with a level shifting circuit 111, located between the buffer amplifier BUFF and the base of the transistor TR3, and a reset disable section 112 which has transistors Q11 and Q12.

This structure suppresses the reset operation when charges retained in the peak holding capacitor CP are discharged to an arbitrary level. Specifically, when the reset signal (RESET="H") is input, the base of the transistor Q11 becomes "H," turning on a transistor Q13. Consequently, the peak holding capacitor CP discharges the charges.

As discharging proceeds and the emitter voltage of the transistor Q12 becomes lower than the base voltage of the transistor Q12 by about the voltage drop caused by a diode D, the transistor Q12 is turned on. As the current is drawn from a resistor R10, the base voltage of the transistor Q13 drops and the transistor Q13 is disabled to stop the reset operation.

FIG. 12 and FIGS. 13A through 13C illustrate the structure which is able to cope with the simultaneous occurrence of charging and discharging of the peak holding capacitor CP when resetting is enabled while input data is present.

Figure 12:
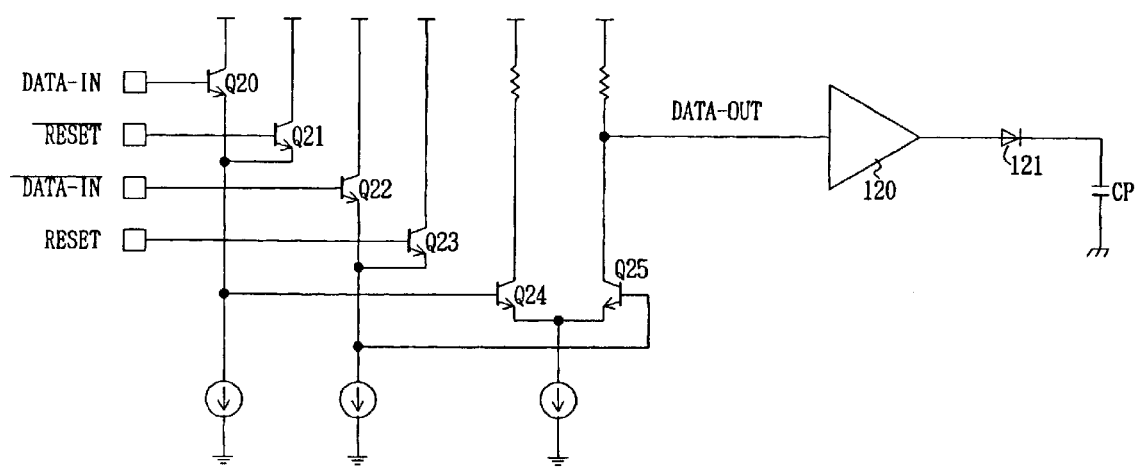
FIG. 12 is a diagram illustrating the structure of a peak detection disable circuit.

When the reset signal is input, this structure stops the peak detection operation of the data signal system and executes the reset operation. FIG. 12 shows the peak detector in FIG. 1 in a simplified form. In FIG. 12, an amplifier 120 indicates the large-signal amplifier AMP1 and the small-signal amplifier AMP2 in FIG. 1. A diode 121 indicates the transistors TR1 and TR2 in FIG. 1.

The operational amplifier OP1 in FIG. 1 is comprised of transistors Q20 to Q25 in FIG. 12. The transistors Q20 and Q21 have their emitters connected together and the transistors Q22 and Q23 have their emitters connected together so that an OR function is provided.

At the time the detected peak value of input data is held, the transistor Q24 in the differential amplifier pair Q24 and Q25 is turned on and the transistor Q25 is turned off, so that the collector potential of the transistor Q25 is charged in the peak holding capacitor CP via the amplifier 120 and the diode 121.

When the reset signal RESET is input to the transistor Q23 in FIG. 12, the transistor Q25 is turned on to stop charging the peak holding capacitor CP and stop the peak detection operation. This structure treats the reset signal RESET by priority even when there is input data, thus preventing the simultaneous discharging and charging of the peak holding capacitor CP.

Figure 13A:
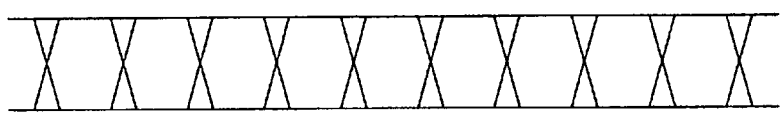
FIGS. 13A through 13C are diagrams for explaining how to stop peak detection.
Figure 13B:
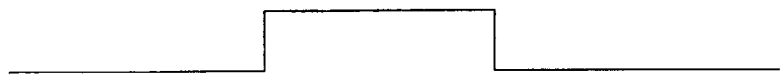
Figure 13C:
Figure 14:
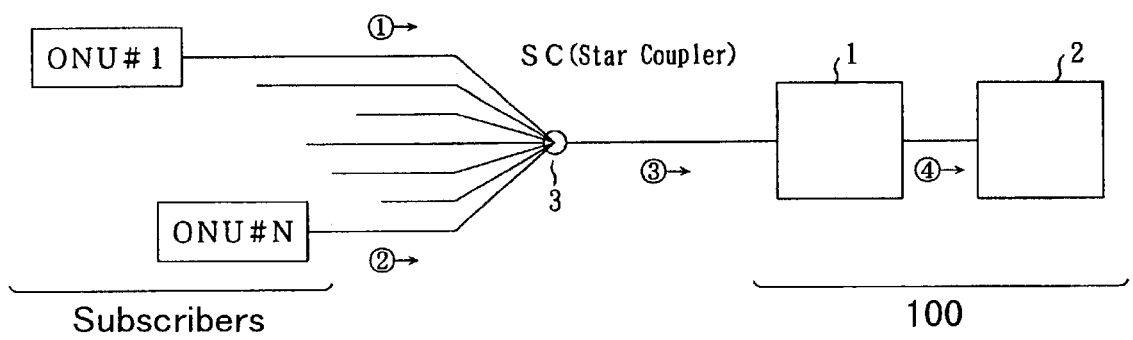
FIG. 14 is a diagram for explaining the position of an optical signal receiver embodying this invention.
Figure 15:
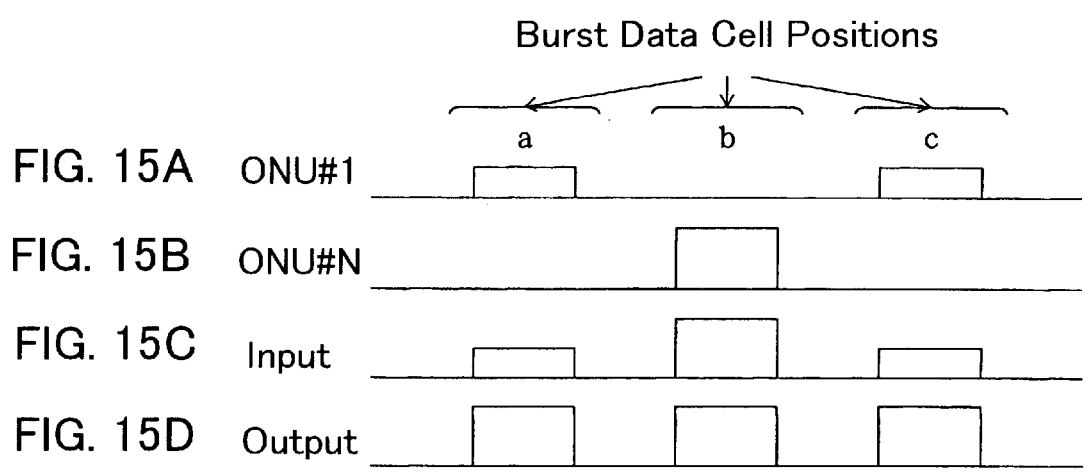
FIGS. 15A through 15D are time charts illustrating a burst optical signal.
Figure 16:
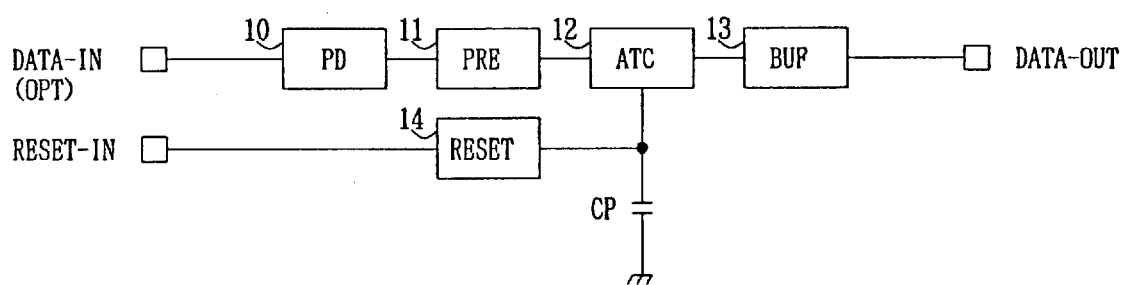
FIG. 16 is a diagram showing the structure of exemplifying the structure of a conventional optical receiver which handles a burst optical signal.

FIGS. 13A–13C present time charts for explaining the above operation. FIG. 13A shows input data, FIG. 13B shows the reset signal RESET and FIG. 13C shows the output of the transistor Q25. It is to be noted that this reset signal RESET has a wider width than the input data. It is therefore possible to surely treat the reset signal RESET by priority to enable the transistor Q25 to stop the output.

As a result, the output is stopped and the peak detection operation is stopped during the period where the reset signal RESET is input as shown in FIG. 13C.

As discussed above with reference to several specific forms of this invention, a plurality of peak detection sections are provided according to the input level to ensure the stable operation at high precision and a wide dynamic range. Further, an offset is forcibly given to the DC feedback circuit to equivalently increase the threshold value, thereby overcoming the conventional problem of an unstable output when there is no input for a long period of time.

Since the operation of the DC feedback circuit is executed in the period where there is no input data, high precision holding of the DC (bottom) level is possible. Further, the use of the analog switch which has a significantly small leak current can ensure the holding of the DC level for a long period of time.

Moreover, the use of the reset disable circuit can deal with the instability resulting from over-resetting.

What is claimed is:

1. A burst optical signal receiver comprising:
an identifying circuit that outputs an identification of an input optical signal by comparing the input level with a predetermined threshold value;
a peak detector that detects and holds a peak value of the input optical signal, the peak detector having a plurality of peak detection sections including a first peak detection section having a first gain and a first input dynamic range and a second peak detection section having a second gain different from the first gain and a second input dynamic range different from the first input dynamic range;
a DC feedback circuit that acquires a DC level of the output of the identifying circuit; and
a threshold circuit that produces a threshold value in accordance with the DC level acquired by the DC feedback circuit and the peak value held in said peak detector and supplies the predetermined threshold value to said identifying circuit as the predetermined threshold value.

2. The burst optical signal receiver according to claim 1, wherein the first peak detection section includes a large-signal amplifier; the second peak detection section includes a small-signal amplifier; and said peak detector further comprises:
an adding circuit that adds outputs of the first and second peak detection sections; and
an offset circuit coupled to an input side of the large-signal amplifier;
whereby a signal representing the input optical signal is directly input to the small-signal amplifier and is input to the large-signal amplifier through the offset circuit.

3. The burst optical signal receiver according to claim 2, wherein the offset circuit comprises a resistor coupled in series with the large-signal amplifier.

4. The burst optical signal receiver according to claim 1, further comprising an offset adding circuit, provided on an input side of the DC feedback circuit, that adds an offset to the output of the identifying circuit.

5. The burst optical signal receiver according to claim 4, wherein the DC feedback circuit has a DC amplifier that adds a positive logic output and a negative logic output of the identifying circuit, and said offset adding circuit has a current adder circuit that adds the offset to an input to the DC feedback circuit.

6. The burst optical signal receiver according to claim 1, wherein said identifying circuit generates a positive logic output and a negative logic output and the DC feedback circuit includes a DC amplifier that adds the positive logic output and the negative logic output of the identifying circuit, an analog switch circuit coupled to an output side of the DC amplifier, and an integration circuit that integrates an output of the analog switch circuit, whereby the analog switch circuit is open to hold the DC level during a period in which input data is present.

7. The burst optical signal receiver according to claim 6, wherein the analog switch circuit includes a differential circuit that cancels a common mode.

8. The burst optical signal receiver according to claim 1, wherein said peak detector includes a NOR gate that receives a reset signal and input data from the input optical signal and stops peak detection when the reset signal is input.

9. A burst optical signal receiver comprising:
an optical converter that generates an electrical signal representative of the optical input signal;
an identifying circuit that outputs an identification of an input level of an input optical signal by comparing the input level with a predetermined threshold value;
a peak detector that detects and holds a peak value of the input optical signal, the peak detector including a plurality of peak detection sections, the plurality of peak detection sections having a first peak detection section having a first gain and a first input dynamic range and a second peak detection section having a second gain different from the first gain and a second input dynamic range different from the first input dynamic range;
a DC feedback circuit that acquires a DC level of the output of the identifying circuit; and
a threshold circuit that produces a threshold value in accordance with the DC level acquired by the DC feedback circuit and the peak value held in said peak detector and supplies the threshold value as the predetermined threshold value to said identifying circuit.

10. The burst optical signal receiver according to claim 9, wherein said peak detector includes a peak holding circuit that holds a peak value of outputs of the plurality of peak detection sections.

11. The burst optical signal receiver according to claim 10, wherein said threshold circuit produces a value representing one-half of a difference between the peak value of the peak holding circuit and the output of the DC feedback circuit as the predetermined threshold value.

12. The burst optical signal receiver according to claim 10, wherein the peak holding circuit includes a peak holding capacitor, said peak detector further includes a reset circuit including a reset section having a first transistor that discharges the charges retained in the peak holding capacitor and a reset disable section having a current path formed by a resistor and a second transistor that disables the first transistor to prevent a reset operation during discharge of the retained charges.

13. A method for receiving a burst optical signal, comprising the steps of:

generating a comparison of an input optical signal with a signal representing a predetermined threshold value;

identifying an input level of the input optical signal in accordance with the comparison;

detecting a peak value of the input optical signal by detecting the peak value with a first peak detection section having a first gain and a first input dynamic range when the input level is within the first input dynamic range, and detecting the peak value with a second peak detection section having a second gain and a second input dynamic range when the input level is within the second input dynamic range;

acquiring a DC level in accordance with a result of the identifying step; and producing the threshold value in accordance with the DC level and the peak value.

* * * * *